March 5, 1929.  W. H. SOMMER  1,704,520
POWER DEMAND REGULATOR
Filed May 14, 1927   8 Sheets-Sheet 1

FIG. 1.

INVENTOR.
William H. Sommer
Chas. H. LaPorte
ATT'Y

March 5, 1929. W. H. SOMMER 1,704,520
POWER DEMAND REGULATOR
Filed May 14, 1927 8 Sheets-Sheet 2

FIG. 4.

March 5, 1929.  W. H. SOMMER  1,704,520
POWER DEMAND REGULATOR
Filed May 14, 1927  8 Sheets-Sheet 5

FIG.5.

INVENTOR.
William H. Sommer
Charles LaPorte
ATTY

March 5, 1929.   W. H. SOMMER   1,704,520
POWER DEMAND REGULATOR
Filed May 14, 1927   8 Sheets-Sheet 7

INVENTOR.
William H Sommer
Charles LaPorte
ATTY

March 5, 1929.   W. H. SOMMER   1,704,520
POWER DEMAND REGULATOR
Filed May 14, 1927   8 Sheets-Sheet 8

INVENTOR.
William H. Sommer
Charles LaPort
ATTY

Patented Mar. 5, 1929.

1,704,520

UNITED STATES PATENT OFFICE.

WILLIAM H. SOMMER, OF PEORIA, ILLINOIS.

POWER-DEMAND REGULATOR.

Application filed May 14, 1927. Serial No. 191,530.

This invention has reference to a power demand regulator.

The invention has for its principal object to provide such a regulator with signalling means, adapted to warn an operator, when the demand reaches a predetermined point, thus enabling the operator to know when to curtail power consumption in order to keep the demand within certain predetermined limits; and including means in operative connection with a control such as a circuit breaker, adapted for operation to shut off the power and automatically stop mill operations, when and in the event such demand exceeds a predetermined point, and the operator fails to heed his signals and reduce his power consumption.

The invention has for a further object to provide power demand regulation to enable the consumer of power to exceed any predetermined demand rate of power consumption as long as the total demand is not exceeded within or at the end of any such predetermined power demand period.

My regulator comprehends in its structure, time period mechanism, certain elements of which are operatively connected with a preferably synchronous motor operative from a power station, while other elements are operatively connected with some suitable power measuring device, as, for instance, a watt-hour meter or demand meter, and the same arranged for synchronous and nonsynchronous action in relation to such first mentioned elements, whereby to indicate by certain signalling means that the demand is being exceeded within certain periods and to automatically shut off power when and in the event power consumption is not curtailed within any such period during such excessive demand; and in the provision of resetting means for said second mentioned elements.

That the invention may be more fully understood, reference is had to the accompanying drawings forming part of this description, illustrating a preferred embodiment of the invention, in which:—

Like characters of reference denote corresponding parts thruout the figures.

While the construction and operation of my regulator are not dependent on a hook-up with a watt-hour or demand meter, altho, certain of its time period elements should have a hook-up with some suitable power measuring device, the results sought are most efficiently obtained thru a hook-up with such a device as a demand meter, and an explanation in this connection will explain more fully to those skilled in the art the application of and uses to which the device may be put.

Those skilled in the use of electric current demand meters understand that such meters are used by consumers of electric current for power purposes, to indicate the rate of power consumption, and that such meters are controlled from "watt-hour" meters, which measure the quantity of current used.

It is further, well understood, by users of electric current for power purposes that the demand rate of use of current is the basis of charges made for such current, and that on such basis, the customer taking power from the power company is penalized by being charged more for his current, if he uses current and exceeds the demand called for in his contract, because the higher the demand on the power station, the more generating equipment must be held in reserve to meet the demand.

It is, therefore, to the advantage of both the customer and the power company, if the customer shall use the current at a more uniform rate, and it is the object of the present regulator, usable in connection with some suitable power measuring device, such, for instance, as a demand meter, to warn the consumer by a suitable signalling means when the demand has reached a predetermined point, thus enabling him to know when to curtail power consumption in order to keep the demand within certain limits.

In demand meters of well known construction the rate of power consumption is indicated in certain "time" periods, usually fifteen (15) minutes long. The various rate of use at different times during the fifteen (15) minute periods are added continuously, and at the end of the "time" period, the marker or recorder of such a meter is set back to zero and the operation started for another "time" period. These meters usually include a chart on which the demand in kilowatts is marked, the marker or recorder being actuated by a magnet, which is in turn actuated from the "watt-hour" meter. All of which, it is believed, will be understood.

Referring to the drawings—the mechanism constituting my regulator is preferably encased within a housing or casing 1 paneled on ends, top and sides by the transparent panels 2; frames or supports 3, 4 and 5 being secured to the base plate of said casing or housing to support the operating parts of such mechanism.

Journaled in bearings 6, carried by the supports 3 and 4, is an elongated tubular time period operating shaft 7, and said shaft is adapted to be continuously operated in one direction. To operate such tubular shaft it has secured thereto a worm gear 8, driven by a worm 9, carried by a worm reduction shaft 10, journaled in suitable bearings on the support 4, also adapted to be continuously operated in one direction. Said shaft carries a worm gear 11, driven by a worm 12 on a driving shaft 13, journaled in the supports 3, 4 and 5, and said shaft is connected thru gearing, not shown, in a housing 14, mounted on the support 5, to a synchronous motor 15, adapted to receive its power from a power station, not shown.

The tubular shaft 7 extends forward of the support 3 and has connected thereto a flanged hub 16 and to said flanged hub is connected a disk 17 of any suitable insulating material, adapted to rotate therewith and with said tubular shaft 7. Said disk is rotatable within an opening 18 of a stationary flanged face plate or dial 19, secured to and supported by the support 3; the faces of both said disk and flanged plate being preferably in the same plane and on said face plate or dial, encircling said disk there are provided a plurality of spaced radially arranged symbols, characters or time indicating marks 20 and 21, which together represent, what I shall choose to term one complete fifteen (15) minute period, so that it will be understood, that the tubular shaft 7 and said disk 17 make one complete revolution during each fifteen (15) minute period.

The tubular shaft 7 terminates at its front and substantially flush with the face of the disk 17 and extends to a suitable point between the supports 4 and 5 as will permit of connection thereto, and to be carried thereby certain gearing and a spring controller, the character of and the purposes and functions of which will be further explained.

Rotatable within the tubular shaft 7 is an intermittently operated shaft 22. This shaft extends both forward of and beyond the front and rear ends of the tubular shaft 7 and rotates in bearing bushings 23 within said tubular shaft, and at its extreme rear end is journaled in a bearing 24 in the support 5. To the forward end of the said shaft 22 is secured a flanged hub 25 to which is also secured a plate or disk 26 and said disk on its inner face carries an electrical current conducting ring 27. Secured to and extending radially from the disk, and connected with the ring 27, are preferably a plurality of hands 28, 29 and 30, different somewhat in length from each other. I also prefer that the hands 28 and 29 extend in radial directions from the disk 26 in diametrically opposite positions and to space the hand 30 a short distance from the hand 28 and to diverge therefrom, and radially from the disk 26. The hand 28, between its ends and on its rear face carries a contact member 31. The hand 29 at its end and on its rear face carries a contact member 32, while the hand 30 at its end and on its rear face carries a contact member 33. The hand 28 is long enough to travel in a clockwise direction across the symbols, characters or time indicating marks 20 and 21 on the face plate 19.

To the front face of the disk 17 is attached a contact ring 34 which is of a diameter such as that described by the contact member 32 on the hand 29, when said hand is rotated by the shaft 22, and said contact member 32 rotates in contact with said ring 34. Attached also to the front face of the disk 17 and partially encircling the contact ring 34 are segments of a ring 35 and 36 and adapted to have a sliding contact with said ring segments is the contact member 31 on the hand 28, and the contact member 33 on the hand 30, as will be explained.

Attached to the rear face of said disk 17 are a plurality of contact rings 37, 38 and 39, one within the other in suitable spaced relation. The ring 37 is preferably concentric with the ring 34 and these two rings are electrically connected to each other by a connecting member 40 passing thru the disk 17. The ring 38 is electrically connected to the segment ring 36 by a connecting member 41, which passes thru the disk 17, and the ring 39 is electrically connected to the segment ring 35 by a connecting member 42, which passes thru the disk 17. The arrangement of the ring and ring segments 34 and 35, 36, respectively, and the rings 37, 38 and 39 and connecting members, is best seen in Figs. 1, 4, 9, 10 and 11.

I provide two signals, preferably in the form of two electric light bulbs 43 and 44; the former when lighted to emit a white light and the latter when lighted to emit a red light. These bulbs may be placed at any convenient point, at the regulator, or at a remote point therefrom, it being left to a matter of mill practice where such bulbs shall be located. The bulb 43 is connected to the ring 39, thru the circuit 45 and the bulb 44 is connected to the ring 38 thru the circuit 46; whereas, the ring 37 is connected direct to the power circuit $L^1$ and both said bulbs are connected to the power circuit $L^2$.

Figure 1:
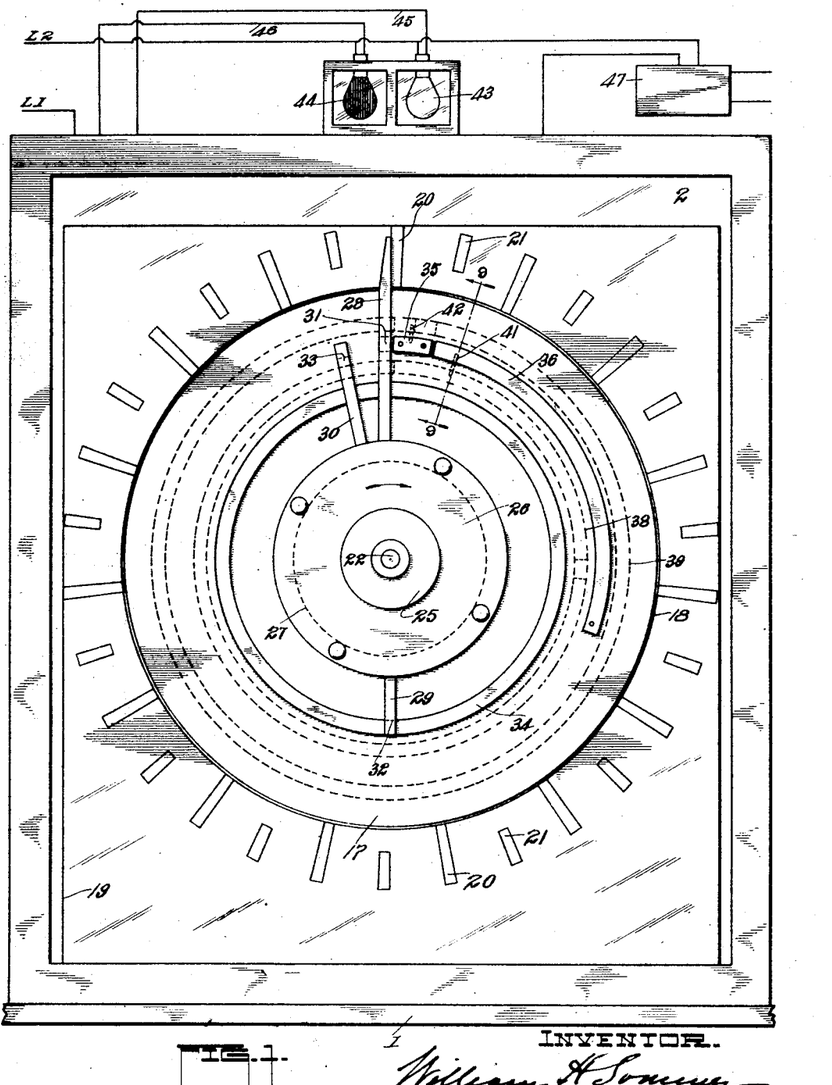
Fig. 1 is a front elevation of a regulator embodying my invention, also showing a signalling means and a control such as a circuit breaker in an electrical circuit including the regulator.
Figure 2:
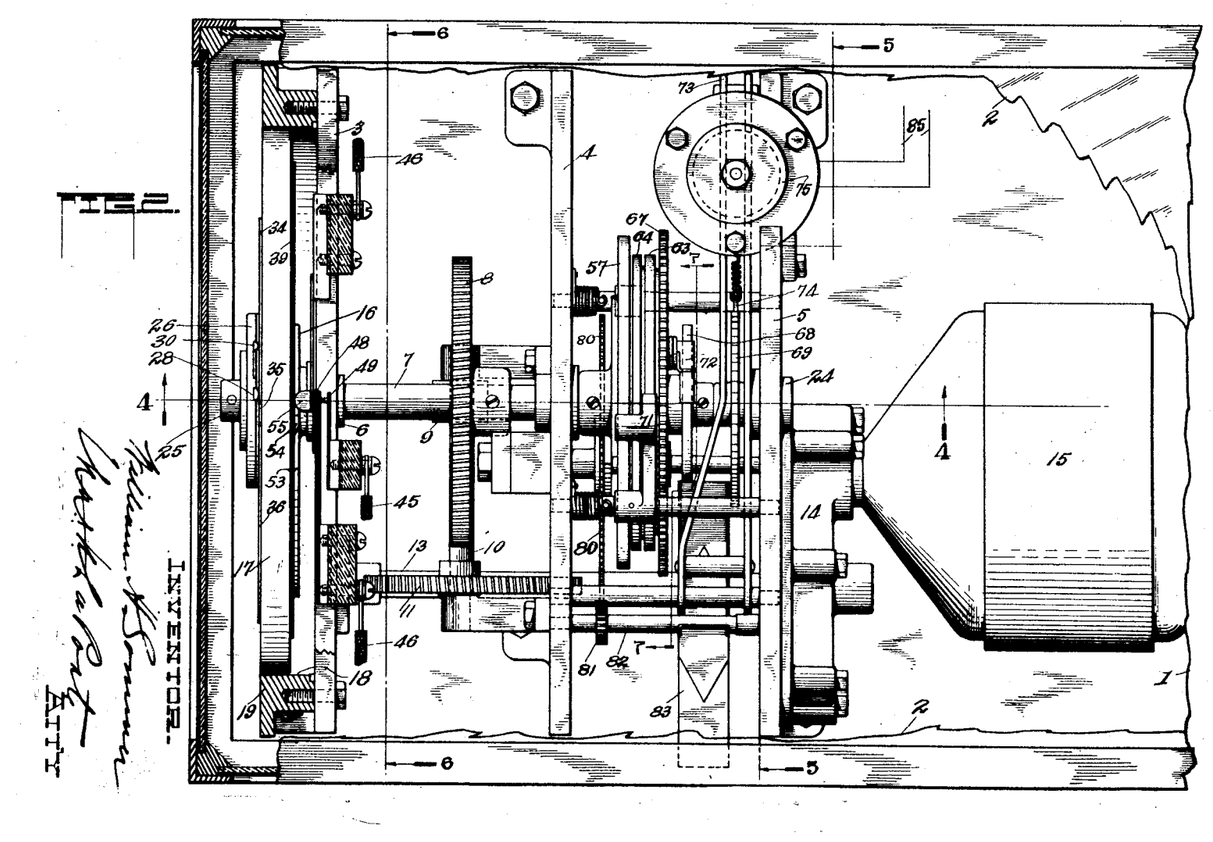
Fig. 2 is a plan view of the mechanism of the regulator, its casing or housing being broken away and partly in section.
Figure 3:
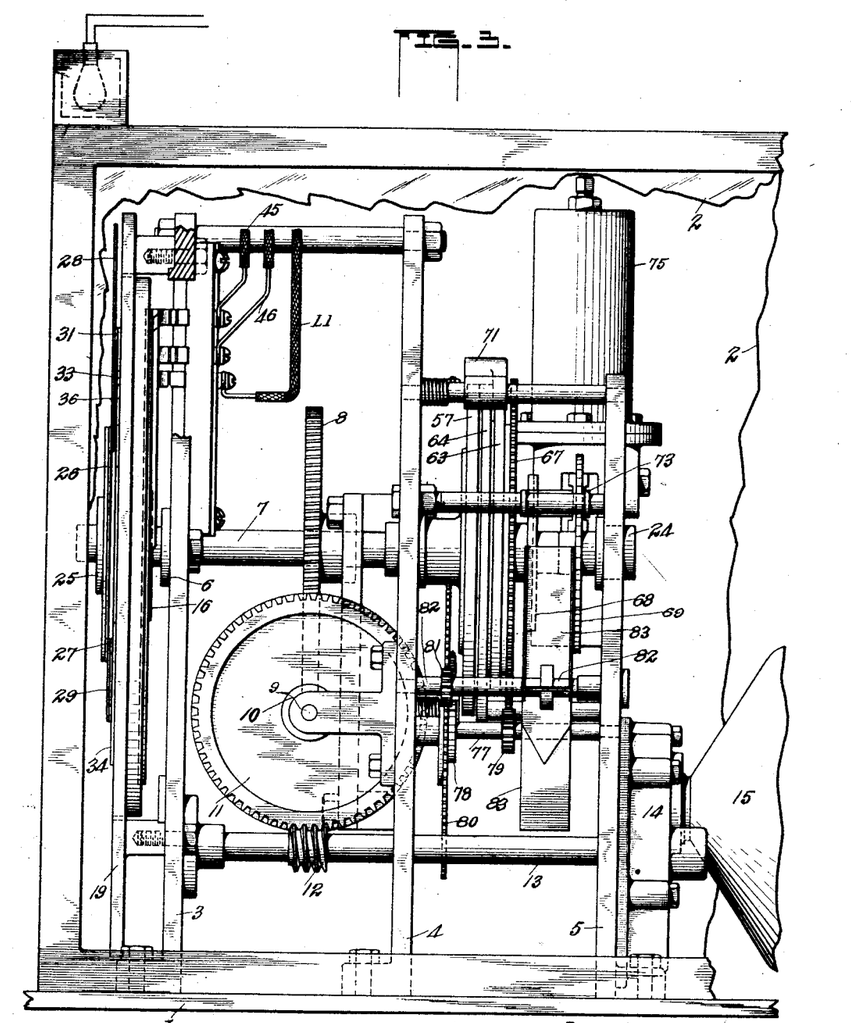
Fig. 3 is a side view of Fig. 2 with the casing or housing broken away.
Figure 10:
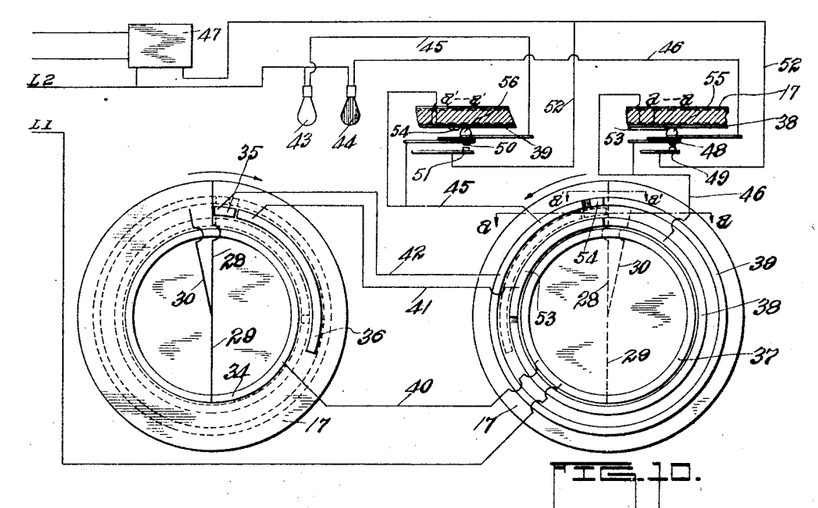
Fig. 10 is a diagrammatic view showing a certain position of elements of the time period mechanism and the electrical circuits connecting the same with the signalling means and the control, such as a circuit breaker; small sectional views such as $a$—$a$ and $a'$—$a'$ are included within the diagrammatic view with similar indicating lines on the main diagrammatic figure corresponding thereto.
Figure 11:
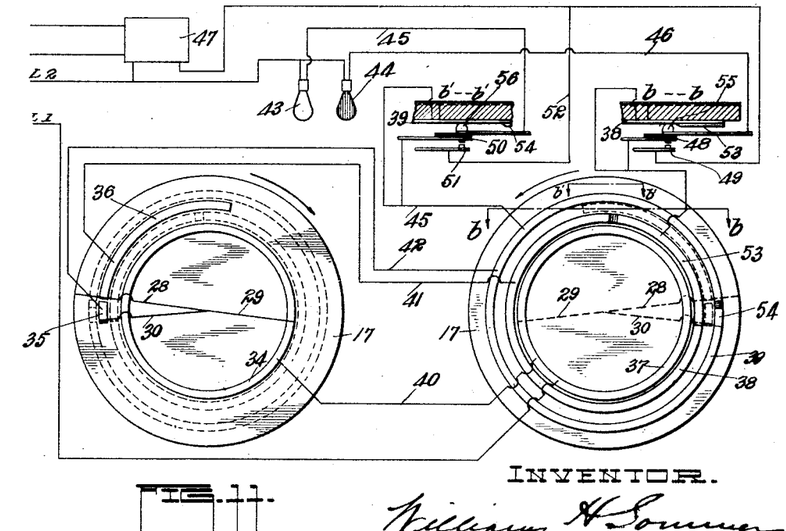
Fig. 11 is a view similar to Fig. 10, except that the elements of the time period mechanism are in a different position, and the small sectional views are designated as $b$—$b$ and $b'$—$b'$, corresponding to the similar designations on the main diagrammatic figure.

Reference being had, particularly, to the diagrammatic views, Figs. 10 and 11, also Fig. 1, the electric circuits are easily traceable thru the rings 37, 38 and 39 to the ring 34 and segment rings 35 and 36, respectively, and to the bulbs 43 and 44, depending on the positions of the hands 28, 29 and 30, as they are rotated about the face of the plate 19, synchronously or nonsynchronously with the rotation of the disk 17. In the position in which the hands 28 and 29 are shown in Figs. 1 and 10, where the contact member 32 on the hand 29 is in contact with the ring 34 on the outer face of the disk 17, and the contact member 31 on the hand 28 and contact member 33 on the hand 30 are not in contact with either of the segments 35 or 36, there will be no glow in either lamps 33 or 34; but assuming that the contact member 31 on the hand 28 is in contact with the segment 35, the current will flow thru the ring 37 to and thru the ring 34 and thence thru the hand 29 to the ring 27 and from thence thru the hand 28 and its contact member 31, thru the segment 35 and thence to the ring 39 and from thence thru the circuit 45, causing the bulb 43 to emit a white light. Such white light will continue to show as long as such contact remains between the contact member 31 and the segment 35; giving notice to the operator that power consumption is at or slightly above the demand. However, should the power consumption be in excess of the demand, the hand 28 will have passed on to the point where the contact member 31 thereon comes into contact with the segment 36 and under such condition, the current will flow from the ring 37 to the ring 34 and thence thru the hand 29 to the ring 27 and hand 28 and thru said hand and its contact member 31 to the segment 36, thence to the ring 38, and from thence thru the circuit 46 to the bulb 44 causing the latter to emit a red light. At this point and during a continuance of the contact of the member 31 with the segment 36 the operator is under notice that the rate of power consumption is in excess of the demand and that his power consumption should be curtailed. In the event that the operator fails to heed the signal emitted by the red light, at or about a predetermined point in the rotation of the disk 17, or fails to heed the signal emitted by the white light, at or about a different but predetermined point in the rotation of said disk 17, and the power consumption is not curtailed before the completion of the fifteen (15) minute period, the power is completely shut off thru the operation of the control 47, brought about by the contact of elements 48 and 49, or 50 and 51, as the case may be, and in a manner to be described, causing the current to flow thru a circuit 52 to the control 47. The actuation of said control 47 will automatically discontinue the power supply to the mill, and while entailing a temporary loss to the consumer of the power, will protect him against an unnecessary fixation of high rates for power based on his abnormal power consumption for a short period or periods. With the present disclosure, I have provided a double check on power consumption, in excess of the demand, by providing that during the time the red light is on, and the contact member 33 on the hand 30 is in contact with the segment 35, the current flowing thru the ring 27 will pass thru the hand 30 to the segment 35 and from thence thru the ring 39 and the circuit 45 to the bulb 43. During the period when the hands 28 and 29 are in contact with the segments 36 and 35, respectively, and the red and white lights are glowing, the operator can observe at a glance that his consumption of power is at or about the point where curtailment of such power should have consideration, and should the use of such excess power continue to the point where both the hands 28 and 30 are in contact with the segment 36 and only the red light glowing, then he knows that the use of power is greatly in excess of what it should be and action is necessary to reduce such power use to a point, at or near the demand.

Reference being further had to Figs. 10 and 11, it will be observed that for the purpose of illustrating the flow of the electric current, I have shown front and rear faces of the disk 17, which better shows the respective rings and segments on both sides, the circuit between such rings and segments and the circuits to the bulbs, and to the control and the contact—making possible the flow of current, under certain conditions, to the control, as well as the respective white and red bulbs.

The contact ring 38 is formed or provided on its exposed surface with a cam surface 53 which extends preferably for about one fourth of the surface of said ring and the contact ring 39 is formed or provided on its exposed surface with a cam surface 54, which, while it terminates along the same radial line as the cam surface 53, is considerably shorter than said cam surface 53. Adapted to ride on the surface of the ring 38, as such ring rotates, is a contact member 55 in the circuit 46 and said member 55 is connected to and insulated from the said contact 48 in said circuit 46. As the disk 17 and the ring 38 are rotated, the cam 53 on said ring is brought into engagement with the contact 55 and it being connected with the contact 48, the latter is caused to be moved into engagement with the contact 49. Should the hand 28 be in contact with the segment 36, when the contacts 48 and 49 are in engagement, it will be obvious that the circuit will be closed between the ring 38 and the segment 36 and current caused to flow thru the contact 48 in the circuit 46, thence thru the contact 49 and from thence thru the circuit 52, energizing the control 47 and discontinuing the supply of power. Adapted to ride on the surface of the ring 39, as such ring rotates, is a contact member 56 in the circuit 45 and said member 56 is connected to and insulated from the said contact 50 in said circuit 45. As the disk 17 and the ring 39 are rotated, the cam 54 on said ring is brought into engagement with the contact 56 and it being connected with the contact 50, the latter is caused to be moved into engagement with the contact 51. Should the hand 28 be in contact with the segment 35, when the contacts 50 and 51 are in engagement it will be obvious that the circuit will be closed between the ring 39 and the segment 35 and current caused to flow thru the contact 50 in the circuit 45, thence thru the contact 51 and from thence thru the circuit 52, energizing the control 47 and discontinue the supply of power.

In Fig. 1 the hands 28, 29 and 30 are, at what may be termed, their normal or starting position, and this is also true of Fig. 10. In such position no current will flow thru the regulator and the lights 43 and 44 will not function. Should there occur a surge in the power consumption, due to any cause, such as will cause the hand 28 to move into contact with the segment 35, it will be obvious from the foregoing description that the circuit 45 in which the bulb 43 is located will be closed causing said bulb to emit a white light. On the other hand should the power consumption be such as to cause the hand 28 to contact with the segment 36 and at the same time cause the hand 30 to contact with the segment 35, both the circuits, in which these bulbs, respectively, are located, will be closed causing the bulb 44 to emit a red light and at the same time the bulb 43 to emit a white light. Also, such power surge may be such as to cause both hands 28 and 30 to move into contact with the segment 36, in which event only the red light will appear, as previously stated. So long as neither of the lights glow the operator need have no concern that power consumption exceeds the demand. However, when the white light appears he will understand that the power consumption is at or beyond the demand. On the showing of both the white and red lights he will know that consumption of power exceeds the demand and curtailment of such power should begin, and when only the red light appears he will understand an emergency in the curtailment of such power consumption exists. Furthermore, should the operator find that his curtailment of power consumption has passed the emergency point, due to the curtailment of such power shutting off the red light and the white light continue to show, he will understand that unless further curtailment of power consumption is made the fifteen (15) minute demand period will soon have been reached and unless such curtailment of power consumption is reduced to the demand the supply of power will be automatically shut off and mill operations caused to cease.

Practice has determined that the length of the segment 36 on the disk 17 is of such a length that there is little or no possibility under all circumstances for the consumption of power to exceed the demand to such an extent as would cause the hands 28 and 30 or either of them to move to a point beyond the end of such segment.

The disposition of the cam surface on the rings 38 and 39, is such, that the red light may glow for approximately three quarters of the rotation of the disk 17 and the white light for a period slightly less than the full rotation of said disk, before the cam 53 shall act in the first instance to shut off the supply of power, and the cam 54 shall act in the second instance to shut off said supply of power.

In Fig. 10 the hands 28, 29 and 30, as stated, are in normal starting position, shown at the left of the figure, with the cams 53 and 54, shown at the right of the figure in a like position. In Fig. 11 the disk 17 is shown to have made approximately three fourths of a revolution and the hands 28 and 30 are contacting, respectively, with the segments 36 and 35, at which time the red and white lights are both glowing. Also it will appear from such figure that the cam 53 has moved about to the point where it will bring about the contacts, previously described, which will close the circuit 52 to the control 47 and shut off the power supply so that with this emergency facing the operator he must curtail the power consumption, at once and before the cam 53 shall act. We will assume, however, that the operator has curtailed power consumption but only sufficient to remove the hand 28 from off the segment 36 onto the segment 35, resulting in the white light showing and the remaining one fourth of the fifteen (15) minute period of time fast diminishing. The operator must, therefore, before the fifteen (15) minute period is reached further curtail power consumption, otherwise, at or just before such fifteen (15) minute period is reached, the cam 54 will have moved to the position of engagement with contacts as will close the circuit to control 47 and shut off the power supply, it being understood that by causing the hands 28 and 29 to be removed from the segments 36 and 35, at the proper times during the rotation of the disk 17, the circuits 46 and 45 are opened thus avoiding the danger of the shutting off of the power supply, thru and by means of the respective contacts 48, 49 and 50, 51, as before explained.

I will now proceed to describe how and by what means the hands 28, 29 and 30 are rotated on the disk 17 and the hands 28 and 29 caused to be brought into contact with the segments 35 and 36, respectively, and again reset at the end of each fifteen (15) minute period.

Figure 4:
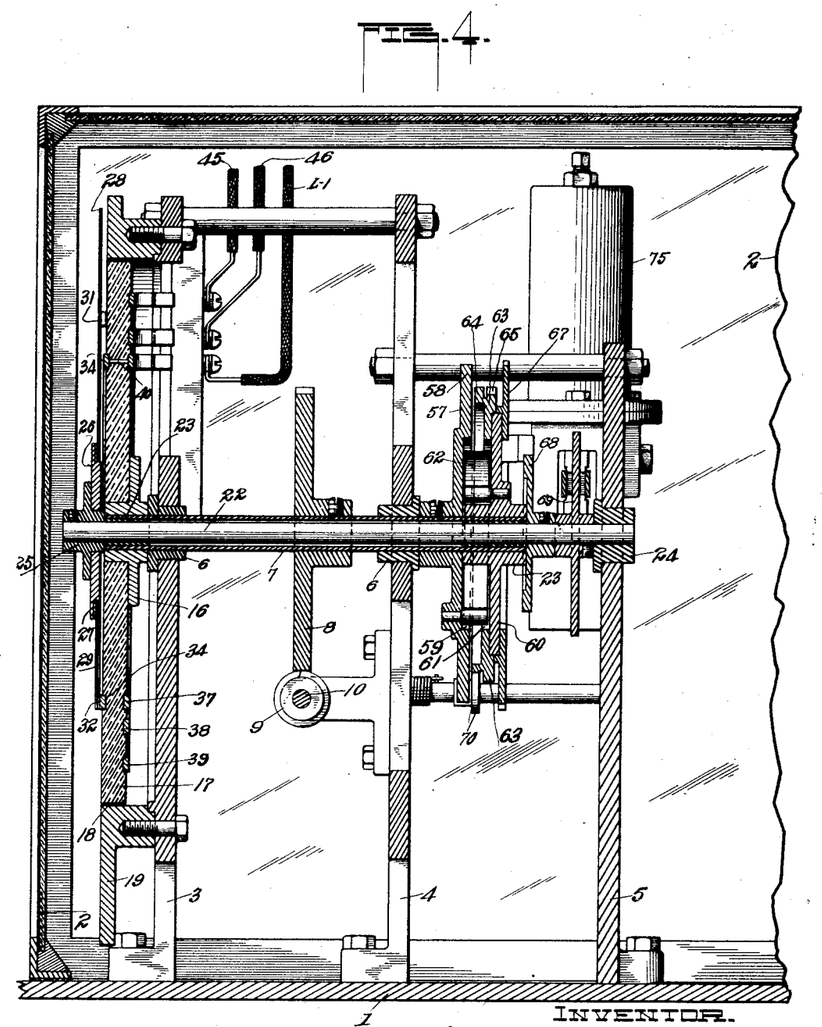
Fig. 4 is a vertical cross-section as the same would appear if taken on the line 4—4, Fig. 2.
Figures 7, 8, 9:
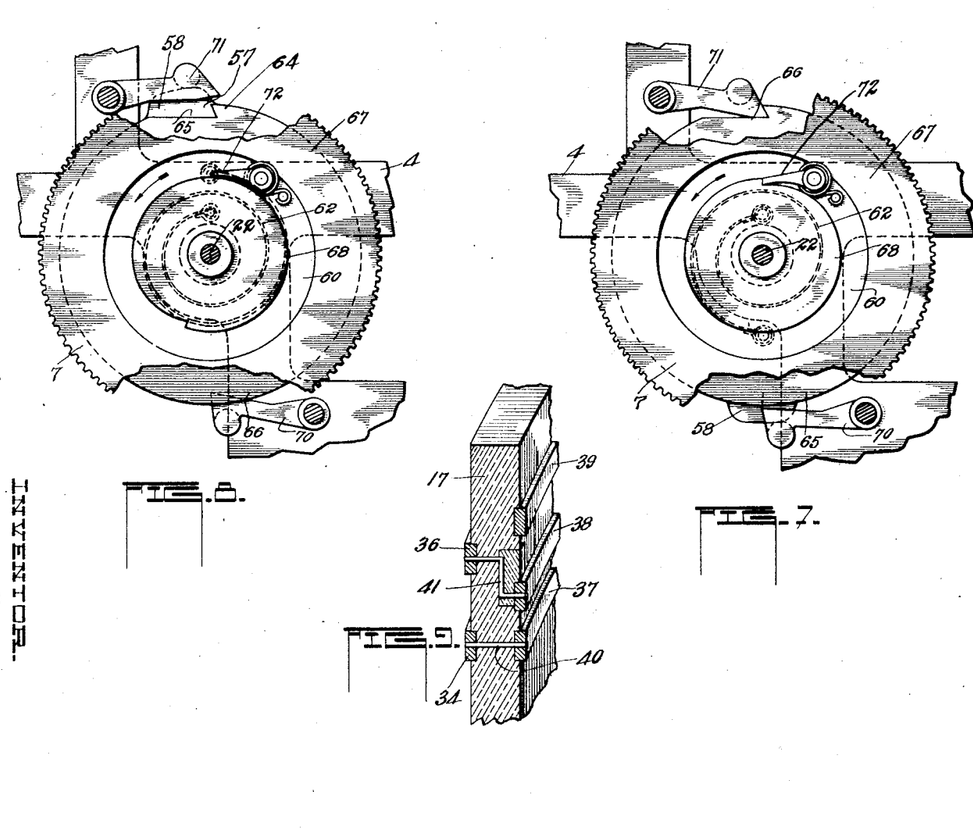
Fig. 7 is a detail, in elevation, as the same would appear if taken on the line 7—7, Fig. 2, showing certain gearing and associated parts in one of their operating positions.
Fig. 8 is a view similar to Fig. 7, showing similar elements in a different operating position.
Fig. 9 is a detail perspective and section of parts, as the same would appear if taken on the line 9—9, Fig. 1.

Secured to rotate with the tubular shaft 7, between the supports 4 and 5, is a cam-disk 57, formed or provided with the peripherally disposed cam member 58, and said disk is provided with the annular depression 59 forming one of two component parts of a spring housing, the other part comprising a disk 60, loosely carried on the shaft 7, and provided with an annular depression 61, and disposed within said seats is a spring 62, one end of which is secured to the disk 57 and its other end secured to the disk 60, see Figs. 4, 7 and 8. The normal securing positions of the opposite ends of said spring is at diametrically opposite positions on opposite sides of the shaft 7. During each fifteen (15) minute period and during each rotation of the shaft 7, the disk 60 being held against rotation, as will be explained, the spring 62 is coiled up in the manner seen in Fig. 8, as compared with Fig. 7, and at the completion of each revolution of said shaft, said member 60 is released, permitting the spring to unwind and the parts associated therewith to be reset.

The disk 60 includes the laterally spaced annular portions 63 and 64 in similarly spaced relation with the disk 57, and the periphery of the portion 63 has formed or provided therein a notch 65, while the periphery of the portion 64 has formed or provided therein a notch 66, which is preferably normally diametrically opposed to the tooth 65 in the portion 63. Said disk 60 is further provided with the annular toothed portion 67, providing a gear, which is in lateral spaced relation to the annular portion 64 of said disk. The hub of the disk 60 holds the same in proper spaced relation to the disk 57 by terminating at one end next adjacent thereto and at its other end in the plane of the end of the tubular shaft 7, and secured on the intermittently operated shaft 22 next adjacent the end of the shaft 7 and the hub of the disk 60 is a single notched disk 68. Also secured to said shaft 22 and next adjacent the disk 68, is a ratchet toothed wheel 69.

Adapted to coact with the notch 65 on the portion 63 of the disk 60 is a spring held pawl 70 pivotally connected with the support 4, and adapted to coact with the notch 66 on the portion 64 of the disk 60 is a spring held pawl 71 pivotally connected with the support 4. To the disk 60 is pivotally connected a spring held pawl 72 adapted to coact with the tooth of the disk 68, see Figs. 7 and 8.

Motion is imparted to the ratchet wheel 69 and thru it to the shaft 22 to which it is secured, by means of a lever 73, comprising parallel spaced bars which lie on opposite sides of the wheel 69 and pivotally supported at one end from the supports 4 and 5. Said lever has pivotally connected thereto a pawl 74, spring held for proper engagement with and actuation of said ratchet wheel as the lever is moved down and up. The opposite end of said lever passes thru a slotted portion of the casing of a solenoid 75 and is pivotally connected to the reciprocal core 76 therein. The solenoid is supported by the support 5 and may be of any approved construction capable of performing the functions required. The operative parts of this solenoid are adapted to be actuated thru an electric circuit 85 and from predetermined impulses received from a suitable power measuring device, such for instance, as a demand meter, not shown. With each impulse imparted by the measuring device the lever 73 is oscillated, in turn imparting an intermittent clock-wise rotation to the shaft 22 thru the ratchet wheel 68 and pawl 74 engaging therewith. Such intermittent rotation of the shaft 22 is correspondingly imparted to the hands 28, 29 and 30 connected with the opposite end thereof. The pulsations imparted to the shaft 22 correspond to and reflect the power consumption, and the hands 28 and 29 will be moved on the face of the disk 17 and in relation to the segments 35 and 36 in the manner and for the purposes previously explained.

Referring now to Figs. 7 and 8. In the former figure the parts are shown in normal or starting position, corresponding to the position of the hands 28, 29 and 30 and the disk 17 in Fig. 1; or in the position the parts will assume by resetting, after each fifteen (15) minute period, being after each complete rotation of the disk 17. In the latter figure the parts have made a one half revolution.

The disk 60 is held against rotation by the pawl 71 engaging the notch 66 in the portion 64 of said disk, at which time the cam 58 on the disk 57 has engaged with the pawl 70 releasing it from the notch 65 in the portion 63 in the disk 60. The tubular shaft 7 being rotated carries with it the disk 57 and its cam 58 releasing the pawl 70, the latter will drop back and ride on the periphery of the portion 63 of the disk 60. When the shaft 7 has made one half revolution the cam 58 on the disk 57 rides under and lifts the pawl 71, and due to the angular design of the notch 66, as well as the toe of the pawl 71, as the latter is raised to release it from the notch 66, the disk 60 will be turned slightly backward and position the notch 65 on the portion 63 of said disk as will permit the pawl 70 to enter and engage said notch 65, at which time the toe of the pawl 71 will ride on the periphery of the portion 64 of the disk 60. The disk 57 continues its rotation bringing the cam 58 to the position in which it is shown in Fig. 7. With this complete revolution of the disk 57, while the disk 60 is held against rotation, the spring 62 is coiled within itself. Now it is at this point and at the conclusion of one complete turn of the shaft 7 and disk 17, being the fifteen (15) minute period referred to that the hands 28, 29 and 30 must be reset from any position they may have assumed from and by reason of a previous operation, to the normal or starting position shown in Fig. 1. This is accomplished by the spring 62 acting to revolve the disk 60, which will make a further complete revolution before the pawl 71, engages the notch 66 to hold the parts in the position seen in Fig. 7. As the disk 60 is rotated by the spring 62 the pawl 72 thereon will engage with the notch on the disk 68 and return it, the shaft 22 and the hands 28, 29 and 30 to their normal or starting position.

Figure 5:
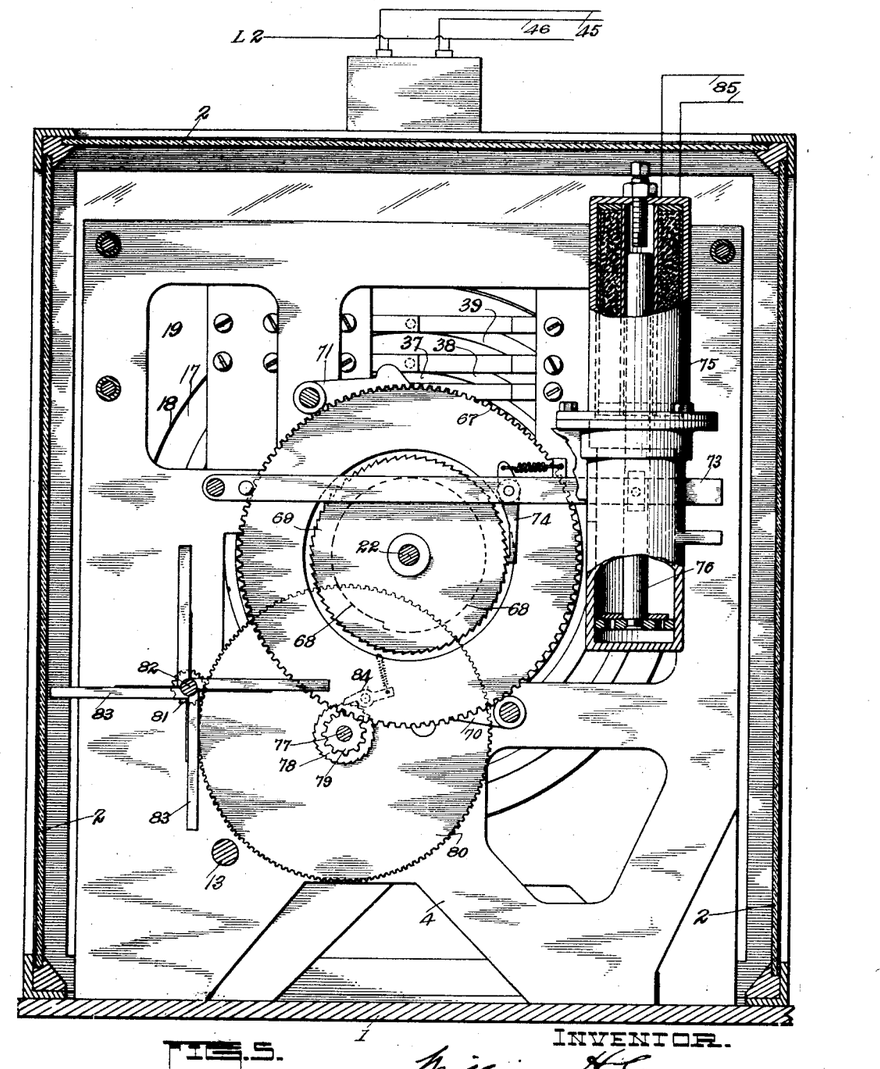
Fig. 5 is an elevation, partly in section, as the same would appear if taken on the line 5—5, Fig. 2.
Figure 6:
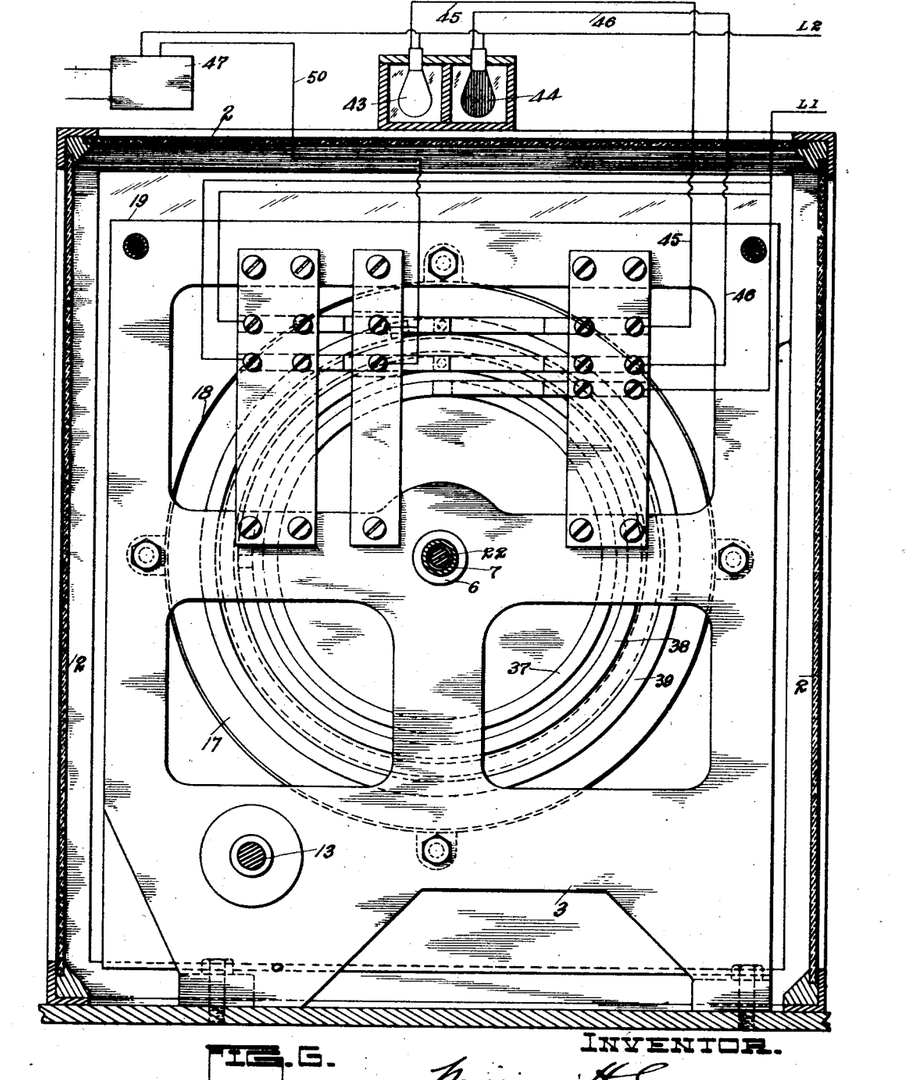
Fig. 6 is an elevation, partly in section, as the same would appear if taken on the line 6—6, Fig. 2.

I provide a governing means for retarding the return action of the spring and parts actuated thereby, whereby to relieve the jar incident to the return of the shaft 22 and hands 28, 29 and 30 to starting or normal position, as shown in Fig. 1, and to prevent any over movement of said hands after they reach their normal or starting position. Such governing means includes a shaft 77 journaled on the supports 4 and 5 and to said shaft are secured a ratchet pinion 78 and a gear pinion 79, while loosely carried on said shaft is a large gear wheel 80 meshing with a gear pinion 81 on a shaft 82 to which is connected a fan 83. The pinion 79 meshes with the gear 67 of the disk 60 and to the said loosely carried gear wheel 80 is pivotally connected the spring held pawl 84 adapted to engage the teeth on the ratchet 78, see Fig. 5. It will be seen that when the spring 62 acts to return the disks 60 and 68 and the shaft 22 to normal or starting position that motion is imparted by the gear 67 to the pinion 79, its shaft 77 which carries with it the ratchet 78 and pawl 84, and the latter in turn causes the gear 80 to rotate and with it the pinion 81 and fan 83. The reduction in the gearing, last described, causing the fan to be rapidly rotated, which will counteract the inertia of the spring 62 and cause the parts being reset to come to normal or starting position with little or no jar and with little or no danger of stopping at other than their normal or starting position, at the end of each fifteen (15) minute period and the beginning of another period.

What I claim is:—

1. A device for the purpose set forth, comprising time period mechanism including a continuously rotatable element provided with conducting segments, one of said segments being in the power circuit, means causing said element to make one complete revolution in a predetermined time interval, signalling means, power controlling means in circuit with certain of said segments and signalling means, a plurality of rotatable indicators in circuit therewith, said indicators having contacts so positioned as to rub against the segments of the rotating element when the indicators are in certain positions relative to the continuously rotating element, means adapted to rotate the indicators at a rate proportional to a power demand; whereby said signals will be energized singly and collectively and said power controlling means actuated, when certain power demands exist, said device also including means for automatically bringing the indicators to a normal position at the completion of each revolution of the element.

2. A device for the purpose set forth, comprising time period mechanism including a continuously rotatable element provided with conducting segments, one of said segments being in the power circuit, means causing said element to make one complete revolution in a predetermined time interval, a dial in association with said element having time period designations thereon, signalling means, power controlling means in circuit with certain of said segments and signalling means, a plurality of rotatable indicators in circuit therewith and arranged to register successively with the time designations on said dial, said indicators having contact so positioned as to rub against the segments of the rotating element when the indicators are in certain positions relative to the continuously rotating element, means adapted to rotate the indicators at a rate proportional to a power demand, whereby said signals will be energized singly and collectively and said power controlling means actuated, when certain power demands exist, said device also including means for automatically bringing the indicators to a normal position at the completion of each revolution of the element.

3. A device for the purpose set forth, comprising time period mechanism including a continuously rotatable element provided with conducting segments, one of said segments being in the power circuit, means causing said element to make one complete revolution in a predetermined time interval, a pair of signals, power controlling means in circuit with certain of said segments and certain of said signals, a plurality of rotatable indicators in circuit therewith, said indicators being in continuous engagement with the segment in the power circuit and certain of said indicators adapted under variable power consuming conditions to energize said signals singly and collectively by engagement with certain other of the segments on said element, means adapted to rotate the indicators at a rate proportional to a power demand, the energization of one of said signals indicating power consumption at or above the demand and the energization of the other of said signals or both of them collectively indicating power consumption in excess of the demand, said device also including means for automatically bringing the indicators to a normal position at the completion of each revolution of the element.

4. A device for the purpose set forth, comprising time period mechanism including a continuously rotatable element provided with conducting segments, one of said segments being in the power circuit, means causing said element to make one complete revolution in a predetermined time interval, a dial in association with said element having time period designations thereon, a pair of signals, power controlling means in circuit with certain of said segments and certain of said signals, a plurality of rotatable indicators in circuit therewith and arranged to register successively with the time designations on said dial, said indicators being in continuous engagement with the segment in the power circuit and certain of said indicators adapted under variable power consuming conditions to energize said signals singly and collectively by engagement with certain other of the segments on said element, means adapted to rotate the indicators at a rate proportional to a power demand, the energization of one of said signals indicating power consumption at or above the demand and the energization of the other of said signals or both of them collectively indicating power consumption in excess of the demand, said device also including means for automatically bringing the indicators to a normal position at the completion of each revolution of the element.

5. A device for the purpose set forth comprising time period mechanism including a continuously rotatable element provided with conducting segments, one of said segments being in the power circuit, means causing said element to make one complete revolution in a predetermined time interval, signalling means comprising differently colored electric light bulbs, power controlling means in circuit with certain of said segments and certain of said bulbs, a plurality of clockwise rotatable indicators in circuit therewith, said indicators being in continuous engagement with the segment in the power circuit and certain of said indicators adapted under variable power consuming conditions to energize said bulbs singly and collectively by engagement with certain other of the segments on said element, means adapted to rotate the indicators at a rate proportional to a power demand, the glow of one of said bulbs indicating power consumption at or above the demand and the glow of the other of said bulbs or both of them collectively indicating power consumption in excess of the demand, said device also including means for automatically bringing the indicators to a normal position at the completion of each revolution of the element.

6. A device for the purpose set forth comprising time period mechanism including a continuously rotatable element provided with conducting segments, one of said segments being in the power circuit, means causing said element to make one complete revolution in a predetermined time interval, signalling means comprising differently colored electric light bulbs, a circuit breaker in circuit with certain of said segments and said bulbs, a plurality of clockwise rotatable indicators in circuit therewith, said indicators being in continuous engagement with the segment in the power circuit and certain of said indicators adapted under variable power consuming conditions to energize said bulbs singly and collectively by engagement with certain other of the segments on said element, means adapted to rotate the indicators at a rate proportional to a power demand, the glow of one of said bulbs indicating power consumption at or above the demand and the glow of the other of said bulbs or both of them collectively indicating power consumption in excess of the demand, and means actuated by certain of the segments on said element, provided said bulbs or either of them are glowing, for separately energizing at different predetermined time intervals, said circuit breaker, said device also including means for automatically bringing the indicators to a normal position at the completion of each revolution of the element.

7. A device for the purpose set forth, comprising time period mechanism including a continuously rotatable element provided with conducting segments, one of said segments being in the power circuit, means causing said element to make one complete revolution in a predetermined time interval, signalling means, a plurality of rotatable indicators in circuit therewith, a synchronous motor operatively connected with said element, an electrically energized element arranged to transmit its pulsations to said indicators, means adapted to rotate the indicators at a rate proportional to a power demand, whereby said signals will be energized singly and collectively, and means for automatically bringing the indicators to a normal position at the completion of each revolution of the element.

8. A device for the purpose set forth comprising time period mechanism including a continuously rotatable element provided with conducting segments, one of said segments being in the power circuit, means causing said element to make one complete revolution in a predetermined time interval, signalling means, a plurality of rotatable indicators in circuit therewith, a synchronous motor operatively connected with said element, an electrically energized element arranged to transmit its pulsations to said indicators, means adapted to rotate the indicators at a rate proportional to a power demand, whereby said signals will be energized singly and collectively, a circuit breaker, means for energizing said circuit breaker provided said signals are actuated when certain power demands exist, and means for automatically bringing the indicators to a normal position at the completion of each revolution of the element.

9. A device for the purpose set forth, comprising time period mechanism including a continuously rotatable time period tubular shaft, an element provided with conducting segments secured to rotate with said shaft, one of said segments being in the power circuit, a synchronous motor causing said element to make one complete revolution in a predetermined time interval, a second shaft arranged to be rotated and journaled axially within said tubular shaft, signalling means, power controlling means in circuit with certain of said segments, and signalling means, a plurality of rotatable indicators in circuit therewith and connected with said second shaft, said indicators having contacts so positioned as to rub against the segments of the rotating element when the indicators are in certain positions relative to the continuously rotating shaft, means adapted to rotate the indicators at a rate proportional to a power demand, whereby said signals will be energized singly and collectively and said power controlling means actuated, when certain power demands exist, said device also including means between the two said shafts adapted when the tubular shaft has made one complete revolution to automatically actuate said second shaft to bring the indicators to a normal position at the completion of each revolution of the element.

WILLIAM H. SOMMER.